Sept. 3, 1940.   P. M. ROSS   2,213,888
APPARATUS FOR MEASURING RATE OF PRECIPITATION
Filed Dec. 29, 1938   2 Sheets-Sheet 1

INVENTOR
Paul M. Ross
BY
ATTORNEY

Sept. 3, 1940.     P. M. ROSS     2,213,888
APPARATUS FOR MEASURING RATE OF PRECIPITATION
Filed Dec. 29, 1938     2 Sheets-Sheet 2

INVENTOR
Paul M. Ross
BY Alpheus J. Crane
ATTORNEY

Patented Sept. 3, 1940

2,213,888

UNITED STATES PATENT OFFICE 2,213,888

APPARATUS FOR MEASURING RATE OF PRECIPITATION

Paul M. Ross, Barberton, Ohio, assignor to The Ohio Brass Company, Mansfield, Ohio, a corporation of New Jersey Application December 29, 1938, Serial No. 248,293

7 Claims. (Cl. 73—151)

This invention relates to apparatus for measuring rate of precipitation such as rainfall or artificial precipitation and has for one of its objects the provision of means whereby the rate of precipitation may be continuously indicated.

A further object of the invention is to provide means by which the rate of precipitation may be indicated by the use of electrical measuring instruments.

A further object of the invention is to provide means whereby the rate of precipitation may be observed at a position remote from the point of measurement.

A further object of the invention is to provide apparatus of the class named which shall be of improved construction and operation.

Other objects and advantages will appear from the following description.

The invention is exemplified by the combination and arrangement of parts shown in the accompanying drawings and described in the following specification, and it is more particularly pointed out in the appended claims.

Figure 1:
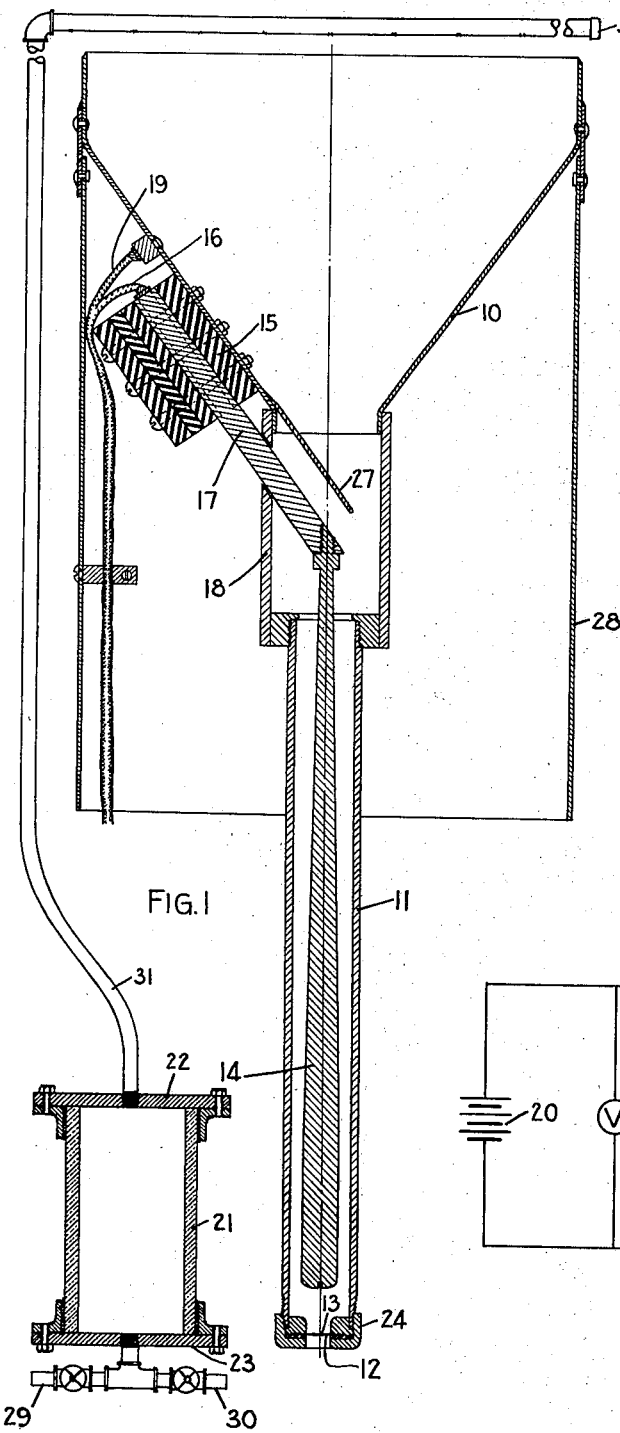
Fig. 1 is a vertical section of one form of apparatus for practicing the present invention.
Figure 4:
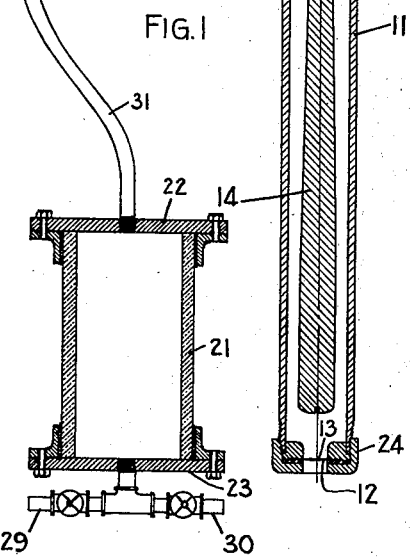
Fig. 4 is a form of calibration curve for the apparatus used in practicing the invention.
Figure 4:
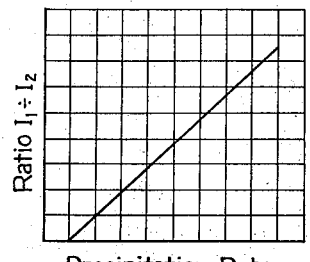

In many scientific and commercial investigations, it is desirable to know the rate of the rainfall or artificial precipitation to which a particular piece of apparatus is subjected. This is particularly true in testing electrical insulation which will be exposed to rainfall when in use and in most instances it is very inconvenient and a waste of valuable time to have to collect the precipitation over a given period in order to ascertain the rate. Furthermore, with a continuously indicating instrument the collection receptacle may be easily moved to various points in the field of precipitation to detect any variations in the rate of different points. This is of particular advantage in arranging artificial precipitation for test purposes. It is also desirable to be able to read the rate of precipitation at a distance from the point under observation not only to avoid exposure to the falling water, but also because of the difficulty of making accurate observations through the falling water at the point of test. These and other advantages are obtained from the present invention, as will be more apparent from the following description.

In the drawings, the numeral 10 designates a funnel shaped receptacle having an opening of known area at the top and being arranged to discharge the water falling into the funnel into a tubular member 11 depending from the lower end of the funnel. The tube 11 is provided at its lower end with a diaphragm 12 having a small perforation 13 through which the water falling into the funnel escapes. The rate of escape of the water through the orifice 13 will, of course, depend upon the pressure at that point, so that as water falls into the funnel, the surface level will rise in the tube 11 until the pressure at the orifice 13 is sufficient to cause the flow through the orifice to be equal to the precipitation in the open end of the funnel. The height of the water in the tube 11 will therefore be a function of the rate of precipitation. If the tube were made of transparent material and graduated, the height of the water in the tube could be observed and the rate of precipitation determined, but as heretofore explained, it is frequently inconvenient or impossible to make accurate observations at the point of investigation, and it is therefore desirable to be able to make the necessary readings at a distant point. In order to accomplish this result, the tube 11 is made of conducting material and an electrode 14 is provided within the tube and insulated from the funnel 10 and the tube 11 by an insulating mounting block 15. A conductor 16 is connected to the electrode 14 by means of a conducting bar 17 which passes through an opening in a support 18 for the tube 11 and is spaced away from the walls of the support 18 so as to prevent electrical connection with the support and the tube 11. A conductor 19 is connected with the funnel 10 and consequently with the tube 11. The parts 10, 11 and 14 are indicated diagrammatically in Fig. 3 as are also the conductors 16 and 19. The conductors 16 and 19 are connected respectively to a source of electromotive force 20, which is shown as a battery, but which may be a source of A. C. voltage to avoid electrolytic action where necessary.

An ammeter $A_1$ is interposed in series with the apparatus to indicate the amount of current flowing. This current will be a function of the height of the water in the tube 11 so that if the resistivity of the water were always the same, a calibration curve could be plotted from which the rate of rainfall could be ascertained from the readings of the ammeter $A_1$. However, water may vary in resistivity depending upon the impurities it contains, and in order to correct for this factor, a second vessel 21 is provided having contact electrodes 22 and 23 engaging opposite surfaces of the water within the vessel 21 and otherwise insulated from each other. The vessel 21 is connected in parallel with the circuit through the tube 11 and a second ammeter $A_2$ is connected in series with the vessel 21 to measure the current flowing therein. The vessel 21 is of constant dimensions and in operation is filled with some of the water, the rate of precipitation of which is to be measured so that water in the vessel 21 will have the same resistivity as the water in the tube 11. Now if $R_1$ is the total resistance of the water in the tube 11 for a given rate of precipitation and $R_2$ is the resistance of the water in the vessel 21, and if $I_1$ is the current flowing in ammeter $A_1$, and $I_2$ is the current flowing in ammeter $A_2$, the current through the two ammeters will be inversely proportional to the resistances in the two circuits which relation may be expressed by the equation:

$$\frac{I_1}{I_2} = \frac{R_2}{R_1}$$

If $K$ is the resistivity of the water and $h$ is the height in tube 11 then:

$$R_1 = K \cdot f\left(\frac{1}{h}\right)$$

$R_2 = K \cdot C$ where $C$ is a constant depending on the dimensions of vessel 21 and the electrodes therein. Hence:

$$\frac{R_2}{R_1} = \frac{K \cdot C}{K \cdot f\left(\frac{1}{h}\right)} = f(h) \text{ and } \frac{I_1}{I_2} = f(h)$$

Figure 3:
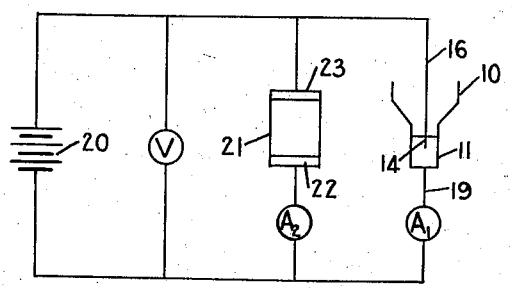
Fig. 3 is a diagram of the electric circuit used in connection with the invention.

But since $h$ is a function of the rate of precipitation, $$\frac{I_1}{I_2}$$

is also a function of the rate of precipitation, independently of the resistivity of the water. By use of the parallel circuit having a vessel of constant dimensions filled with water of the same resistivity as the precipitation water and by taking the ratio of the current in the two vessels, the resistivity of the water is eliminated as a factor. If now the apparatus is calibrated, the instantaneous rate of rainfall may be ascertained from the two instruments $A_1$ and $A_2$ by referring the ratio of their readings to the calibration curve. The calibration is made by subjecting the apparatus to different rates of precipitation. The rate is ascertained by collecting the water escaping through the orifice 13 for a unit of time, and at the same time, the ratio between the readings of the instruments $A_1$ and $A_2$ is noted. The rate of precipitation may be plotted against the ratio of the instrument readings for a series of precipitation rates within the limits of the instrument. After the instrument has once been thus calibrated, it is only necessary to fill the vessel 21 with the precipitation water after which the rate of precipitation may be ascertained at any time by referring the ratio of the readings of the two ammeters $A_1$ and $A_2$ to the calibration curve. Where the apparatus is used for measuring the rate of artificial precipitation, the vessel 21 may be continuously kept full of the precipitation water by passing the water through the vessel 21 before it is discharged from the precipitation head. This is illustrated somewhat diagrammatically in Fig. 1 in which 29 and 30 designate different sources of water supply that may be selectively passed through the vessel 21 and pipe 31 to the precipitation head 32 which, of course, will be of suitable size and spacing to give the desired distribution of artificial precipitation. The contact plate 22 connected with the precipitation head by pipe 31 will be electrically connected with the same terminal of the battery 20 as the collection receptacle 19 as shown in Fig. 3, so that there will be no tendency for current leakage through the water streams falling from the head to the collection receptacle.

Figure 2:
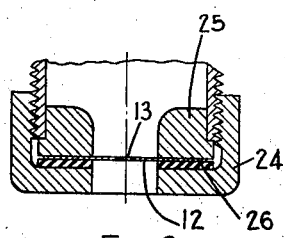
Fig. 2 is a fragmentary sectional view of a portion of the apparatus shown in Fig. 1 but on a larger scale.

As shown in the drawings, the electrode 14 is preferably tapered, the lower end being larger than the upper end. It has been found in practice that this gives a more nearly straight line calibration curve than is produced by an instrument in which the inner electrode is a straight cylinder. The diaphragm 13 as shown in Fig. 2 is removably secured in place by means of a cap 24, a shoulder block 25 and a gasket 26. It is, of course, necessary that the orifice 13 and the contact surfaces of the tube 11 and electrode 14 be kept free from accumulations of all kinds and for this reason the parts are made easily demountable for cleaning. Stop shoulders are provided for the threaded parts so that after they have been taken apart for cleaning, they can be reassembled without changing any relative positions or dimensions that might affect calibration. To prevent falling water from striking the inner electrode and thus possibly forming an extra conducting path between the electrode and the outer receptacle, a shield 27 is arranged above the conductor bar 17 and upper end of the electrode 14. A shield 28 covers the electrical connections to protect the insulation from any moisture that might otherwise cause current leakage.

Figure 5:
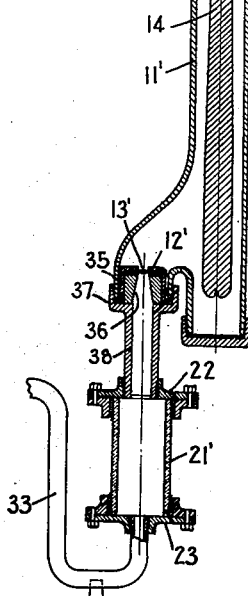
Fig. 5 is a vertical sectional view of a modified form of the invention.

In measuring the rate of precipitation of natural rainfall, an arrangement similar to that shown in Fig. 5 may be used. In this arrangement the collection receptacle is similar to that of Fig. 1 except that the funnel shaped member 16 is exposed to falling rain instead of water from a precipitation head. Instead of passing the water through the vessel 21 prior to collecting it in the receptacle, as in Fig. 1, it is more convenient in the case of natural rainfall to pass the water from the collection chamber to a receptacle 21' as in Fig. 5. This receptacle is provided with a drain having a stand pipe 33 to cause the water to fill completely the receptacle 21. The terminal heads 22 and 23 will be connected in the electric circuit in the manner shown in Fig. 3.

Figure 6:
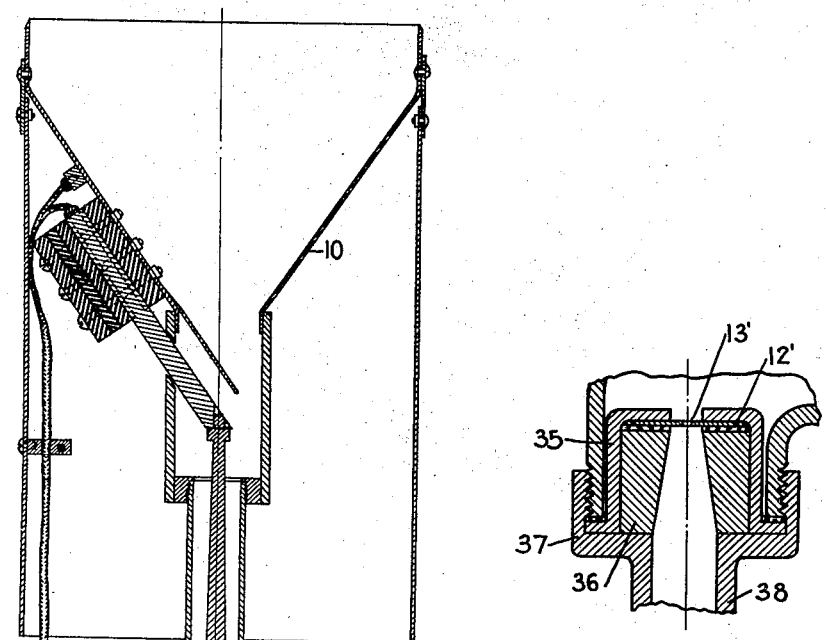
Fig. 6 is a fragmentary section on a larger scale of a detail of the apparatus shown in Fig. 5.

In Fig. 1 before a reading of the ammeter $A_1$ may be taken it is necessary for a sufficient amount of water to collect in the receptacle 11 to make contact with the electrode 14. In Fig. 5 an arrangement is shown in which the electrode 14 makes continuous contact with the water in the receptacle 11' so that no delay is required before readings can be taken after precipitation begins. A diaphragm 12' is arranged in a branch arm of the receptacle 11' above the lower end of the electrode 14 so that the residual liquid in the bottom of the receptacle 11' will always contact the electrode and so that as soon as water begins to fall into the device it will start to rise in the receptacle 11' and escape through the orifice 13' of the diaphragm. If found necessary, a little water may be added at intervals as a matter of routine to the receptacle 11' to replace any deficiency due to evaporation and maintain the surface on a level with the diaphragm so that when precipitation occurs the readings will not be delayed to permit initial accumulation in the bottom of the receptacle. Any excess introduced during replenishment will, of course, escape through the orifice 11' to give the correct surface level. The diaphragm is held in place by a cup 35 and pressure block 36 which are secured at the bottom of the branch portion of the receptacle 11' by a screw cap 37 on the upper end of a riser pipe 38 connected with the vessel 21'. The construction of the support for the diaphragm is more clearly shown in Fig. 6, from which it will be apparent that the parts may be readily separated for cleaning.

I claim:

1. A rate of precipitation gauge comprising a collection receptacle into which water may be precipitated, said receptacle having an escape orifice through which water is forced from said receptacle by the head of water therein, and an electrical circuit controlled by the head of water in said receptacle and having an indicator, the reading of which is a function of the height of liquid in said receptacle.

2. A rate of precipitation gauge comprising a collection receptacle having an escape orifice, means for directing water of precipitation into said receptacle to produce a head of water in said receptacle depending upon the rate of precipitation, an electrode extending into said receptacle, an electric circuit connected with said electrode and with said receptacle so that water in said receptacle forms a portion of said circuit, and means for measuring the current flowing in said circuit to indicate the head of water in said receptacle and consequently the rate of precipitation.

3. A rate of precipitation gauge comprising a collection receptacle having an escape orifice therein, means for directing precipitation into said receptacle to produce a head of water in said receptacle as a function of the rate of said precipitation, an electrode extending into said receptacle, an electric circuit including said electrode and the water in said receptacle and an instrument for indicating the current flowing in said circuit to indicate the rate of precipitation.

4. A rate of precipitation gauge comprising a collection receptacle having an escape orifice therein, means for directing water of precipitation into said receptacle to provide a head of liquid therein sufficient to force the liquid through said orifice at the same rate that it enters said receptacle, an electric circuit of which the liquid in said receptacle forms a part, the resistance of said circuit being a function of the head and of the resistivity of liquid in said receptacle, a measuring instrument in said circuit for indicating the rate of flow of current through said liquid, a correction vessel of fixed dimensions having heads forming electrodes spaced apart by a wall of insulating material, said vessel being supplied with liquid of the same resistivity as the liquid in said collection receptacle, means for connecting said correction vessel in parallel with the circuit including said collection receptacle, and an instrument for indicating the current flowing in the correction vessel to facilitate determination of the ratio of the currents flowing in said collection receptacle and said correction vessel to provide data for the determination of the rate of precipitation independently of the resistivity of the precipitation liquid.

5. A rate of precipitation gauge comprising a receptacle having an escape orifice in the lower portion thereof, an electrode extending into said receptacle, an electric circuit connected to said electrode and the wall of said receptacle to pass electric current through the liquid in said receptacle, and an instrument for indicating the current flowing in said circuit, said electrode being tapered and having the smaller end thereof projecting from said liquid.

6. A rate of precipitation gauge comprising a receptacle, means for directing precipitation into said receptacle, an electrode extending into said receptacle, an electric circuit connected with said electrode and the wall of said receptacle for passing current through the liquid in said receptacle, said receptacle having a removable diaphragm at the lower end thereof provided with a perforation for the escape of liquid from said receptacle.

7. A rate of precipitation gauge comprising a receptacle having a funnel shaped portion at its upper end for directing water of precipitation into said receptacle, a removable diaphragm at the lower end of said receptacle having a perforation therein for the escape of water from said receptacle, an electrode disposed in said receptacle, means for insulating said electrode from the wall of said receptacle, an electric circuit connected with said electrode and the wall of said receptacle for directing current through the water in said receptacle, an instrument for indicating the amount of current flowing in said circuit, and a shield for protecting said electrode from water falling into said receptacle.

PAUL M. ROSS.